३,७६७,८१८

PHENYL NITRONE-CONTAINING COMPOSITIONS USEFUL AS ANTI-MICROBIAL AGENTS

Kenneth P. Dorschner and James A. Albright, Jacksonville, Fla., assignors to SCM Corporation, Cleveland, Ohio
No Drawing. Filed May 3, 1971, Ser. No. 139,833
Int. Cl. A01n 9/20
U.S. Cl. 424—330
4 Claims

ABSTRACT OF THE DISCLOSURE

Novel anti-microbial compositions comprising an inert carrier and a defined class of di-aryl nitrones are described. The compositions are advantageous in that they have high fungicidal activity against a substantially broad spectrum of plant pathogenic fungi, while at the same time the compositions are essentially non-phytotoxic to selected crops and ornamental plants in the fungicidally active amounts employed.

Also described are processes for controlling plant pathogens in soil by soil treatment or by treatment of the crop plant seeds.

BACKGROUND OF THE INVENTION

The invention relates to novel compositions which have been found to be particularly effective against soil-inhabiting and/or seed-borne pathogenic micro-organisms, especially fungi. The compositions are useful in that when they are applied to soils infested with phyto-pathogenic micro-organisms as amendments to the soils or onto seeds before planting, they are highly effective as protective agents and permit normal growth and development of the desired plant species.

The lack of phytotoxicity of these compositions permits the treatment of seeds of plant species which are normally highly sensitive to mercurial fungicides such as, for example, the seeds of corn and peanuts. This activity is beneficial, since the same compositions control pathogens which are normally controlled with mercurial fungicides. Di-aryl nitrones are known and have been used as intermediates in synthetic organic reactions. They are known to undergo molecular rearrangement to a variety of intermediates. By way of example, diphenyl nitrone, one of the advantageous compounds employed in the compositions of this invention, is known to change to 2,3-diphenyloxaziridine upon irradiation with long wavelength ultraviolet light. However, the utility of this class of compounds in pesticidal applications has not, to the best of applicants' knowledge and belief, been known before the present invention.

SUMMARY OF THE INVENTION

In its broadest aspect, the invention provides a composition comprising a mixture of:

(a) an inert carrier, and
(b) an antimicrobially effective amount of a diaryl nitrone where the alpha-aryl group is substituted or unsubstituted and the N-aryl group is unsubstituted.

In a preferred embodiment, the invention provides compositions comprising:

(a) an inert carrier, and
(b) a fungicidally effective amount of a compound of the formula

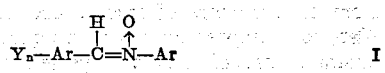
I where Y is a substituent selected from the group consisting of halogen, hydroxyl, alkyl, alkoxy and nitro-, n is an integer of from zero to five, and Ar is phenyl.

Such compositions, when used to contact soils contaminated with micro-organisms which are pathogenic to cultivated plants or when used to contact seeds of certain crop plants, effectively prevent substantial injury to or the killing of plants which are susceptible to attack by such soil-inhabiting micro-organisms, especially fungi. The compositions of this invention have been found to be effective against a wide spectrum of plant pathogens which damage or kill crop plants such as, for example, cotton, corn, oats, peas, peanuts, soybeans, sugar beets, beets, anions, melons, and the like.

Examples of species of genera which are pathogenic to plants and which are controlled or killed by the compositions of this invention include species of: Rhizoctonia, Thielaviopsis, Pythium, Fusarium, Sclerotium, Aphanomyces, Urocystis, Pyrenochaeta, Xanthomonas, Glomerella, Helminthosporium, Rhizopus, Aspergillus, Phoma, Gibberella, Ustilago, and the like. Various species of the above-recited genera of organisms are known to cause pre-emergent and/or post-emergent diseases in or on one or more of the abovementioned plants, sometimes causing complete crop destruction, and almost always resulting in a severe reduction in crop yield.

The anti-microbial activity of the compositions of this invention is surprising because most pesticidal agents which are incorporated in soils or placed on seeds are narrow in the spectrum of microbial plant pathogens which they control and are frequently phytotoxic at the higher dosages required for disease control. On the other hand, the compositions of the present invention are not phytotoxic at levels at which they totally eliminate or control a variety of plant pathogens.

In another aspect, the invention provides a process which comprises contacting soil containing micro-organisms which are pathogenic to cultivated plants with from about 0.6 to about 100 pounds per acre broadcast of said soil of the compositions falling within the scope of this invention.

As will be evident hereinafter from the specific examples, compositions containing compounds falling within the scope of the above formula effectively kill or control the growth of a broad spectrum of soil-inhabiting micro-organisms which are pathogenic to plants.

In still another aspect, the invention provides a process which comprises contacting at least a portion of the surfaces of the seeds of cultivated plants with from about 0.2 to about 4 percent, based on the weight of the seeds, of compositions falling within the scope of this invention, thereby rendering such seeds resistant to attack by soil-inhabiting micro-organisms which are pathogenic either to the seeds or to the plants which germinate therefrom.

When seeds are planted in soils, pathogenic micro-organisms often attack the seed embryo and injure or destroy it before it can grow. Also and more often, the micro-organisms attack the plant embryo just after the germination of the seed, killing it or severely impairing its growth and development, It has presently been found that compositions falling within the scope of this invention, when applied to at least a portion of the surfaces of seeds, will render the seeds resistant to attack by soil-inhabiting micro-organisms which are pathogenic to the seeds and/or plants, thereby rendering the seed, or the plant which develops from the seed, resistant to attack by such micro-organisms.

The compounds employed in compositions falling within the scope of this invention are di-aryl nitrones wherein the alpha-aryl group may be substituted or unsubstituted and the N-aryl group is unsubstituted. As a class, nitrone compounds have the following nucleus:

II

As will be apparent to those skilled in the art, in compounds falling within the scope of the above-described Formula I, one aryl group is attached to the carbon atom and one aryl group is attached to the nitrogen atom of the nitrone molecule. The aryl group attached to the carbon atom is sometimes referred to as the alpha-aryl group. The aryl group attached to the nitrogen atom is referred to as the N-aryl group. From the above formula, it is also apparent that Y is a substituent, one or more of which can be attached to the alpha-aryl group. In the above formula, Y can be a halogen, hydroxyl, lower alkyl, lower alkoxy or nitro-, and $n$ is an integer of from zero to five; Ar being phenyl in all instances.

In compositions where, in the above-referred-to compound, $n$ is zero, the single nitrone which has been found to be advantageous is designated alpha-N-diphenyl nitrone. This compound has been found to be an advantageous fungicide.

Compositions in which, in the above-noted compounds, falling within the scope of Formula I, Y is a halogen atom and $n$ is one, Y can be a chlorine, bromine, or fluorine atom also provide active compositions.

Compounds which have been found to provide particularly advantageous compositions are as follows: alpha-(2-chlorophenyl) - N-phenyl nitrone, alpha-(3-chlorophenyl)-N-phenyl nitrone, and alpha-(4-chlorophenyl)-N-phenyl nitrone. These compounds and their corresponding bromo- and fluoro- derivatives have been found to be effective fungicides when employed in the compositions of this invention.

Compositions in which, in the compound, Y is halo and $n$ is two, advantageously contain alpha-(2,4-dichlorophenyl)-N-phenyl nitrone and/or alpha-(3,4-dichlorophenyl)-N-phenyl nitrone. These compounds and their corresponding bromo and fluoro derivatives have also been found to provide advantageous fungicidal compositions.

Another effective compound which has been found to provide especially advantageous compositions is one wherein Y is fluoro and $n$ is five and is designated as alpha-(pentafluorophenyl)-N-phenyl nitrone. Although distinctly different, compounds wherein Y is halo and $n$ is an integer of from one to five may be employed, the hereinbefore designated compounds are generally preferred for economic reasons.

In the above compositions, those in which Y in the compound is a nitro substituent have also been found to be advantageous and in such compounds $n$ is an integer of one or two. Particularly advantageous compositions are those containing the following specific compounds: alpha-(2-nitrophenyl)-N-phenyl nitrone, alpha-(3-nitrophenyl)-N-phenyl nitrone, alpha-(4 - nitrophenyl)-N-phenyl nitrone, and alpha-(2,4-dinitrophenyl)-N-phenyl nitrone.

The compositions can also contain compounds in which Y is a hydroxyl substituent and $n$ is an integer of from one to five. Of these compounds, those wherein $n$ is one have been found to be preferable for economic reasons. Specific embodiments of such compounds are alpha-(2-hydroxyphenyl)-N-phenyl nitrone, alpha-(3-hydroxyphenyl)-N-phenyl nitrone and alpha-(4-hydroxyphenyl)-N-phenyl nitrone.

As noted hereinbefore, Y can also be a lower alkyl group including methyl, ethyl, propyl, and butyl, and the alkyl group can either be on the one, two, or three positions of the phenyl group. Also, Y can be a lower alkoxy group including methoxy, ethoxy, propoxy, butoxy, etc. Compositions containing compounds wherein Y is lower alkyl or lower alkoxy are usually those in which $n$ is one for economic reasons. However, $n$ can also be an integer of from one to five, usually an integer of from one to three.

Particularly advantageous compositions are those containing one or more of the compounds specifically set forth above. It is to be understood that almost any compound, if used in sufficiently high concentrations, behaves as a foreign substance and in such circumstances will have some adverse affects upon seeds or plants. However, compounds falling within the scope of the formula of the compositions of this invention generally are fungicidally effective at levels far below those which are phytotoxic to crop plants.

The inert carrier or diluent employed in the compositions of this invention can be any carrier conventionally used in the agricultural pesticide are with the proviso that the carrier should be inert; that is, it should be incapable of undergoing a chemical reaction with the di-aryl nitrones in the compositions of this invention. Also, the carrier should not be harmful to the plant or plants which the composition is designed to protect against attack from microbial pathogens.

The carrier can be any one of a variety of organic and inorganic liquid, solid or semi-solid carriers or carrier formulations conventionally used in soil treatment or seed treatment formulations or products.

Examples of organic liquid carriers are the voltatile liquid aliphatic hydrocarbons such as pentane, heptane, hexane, octane, etc., and their analogs as well as liquid aromatic hydrocarbons; for example, benzene, ortho-xylene, meta-xylene, and para-xylene; 1,2,3-trimethyl benzene; 1,2,4-trimethyl benzene; or 1,3,5-trimethyl benzene as well as naphthalene, alpha-methyl naphthalene, beta-methyl naphthalene, and the like.

In addition to the above-mentioned liquid volatile hydrocarbons and often used in conjunction therewith, the carrier can contain conventional emulsifying agents; for example, nonionic surfactants such as the ethylene oxide condensate of an alkyl phenol or an anionic surfactant such as an alkali metal salt of an alkyl benzene sulfonic acid. Such emulsifiers are used to permit the compositions to be dispersed in and diluted with water for end-use application.

Other inert diluents including conventional volatile aromatic and aliphatic esters, aldehydes, and ketones may be employed also, and when employed are usually used in combination with the abovementioned aliphatic and aromatic hydrocarbons.

Solid carriers which may be used in the compositions of this invention include finely-divided inorganic solid materials. Suitable finely divided inorganic carriers or diluents include siliceous minerals such as clays; for example, bentonite, attapulgite, fuller's earth, diatomaceous earth, kaolin, mica, and finely divided quartz. Other inert carriers include synthetically prepared, finely divided amorphous siliceous materials such as silica aerogels and precipitated and fume silicas.

Examples of finely divided solid organic materials which can be employed as a diluent or carrier in the compositions of this invention include powdered, solid nonionic and anionic surfactants, starch, flour, sawdust, casein, gelatin and the like. In one advantageous embodiment, the inert carrier, when solid, will usually contain a mixture of a finely divided siliceous material and one or more surfactants.

The kind of inert carrier employed will depend upon the end use of the compositions and the nature of the pathogenic organism which it is necessary or desirable to control. By way of example, where it is desired to treat seeds prior to planting, the carrier can be a slurried dust or an adherent powder having at least one of the phenyl nitrones falling within the scope of the formula dispersed therein. Conversely, where it is desired to employ a composition to contact soils, the composition can be a wettable powder in which the inert diluent or carrier is a mixture of siliceous mineral, usually a clay, and one or more of a mixture of anionic and nonionic surfactants. Also, the composition can be a liquid spray usually containing an organic solvent dispersed in water by means of conventional emulsifiers. In such instances, a composition may be granular in form. Any of the three kinds of compositions can be advantageously used to contact soils with one or more of the phenyl nitrone compounds hereinbefore described. Such compositions may be applied to the soil directly or may be further diluted with water and applied as dispersions.

The amount of inert diluent or carrier employed in the compositions of this invention may vary considerably depending upon the intended end use of the compositions. When the composition is to be applied to soil, it should be designed to contain that amount of material which will provide a fungicidally effective amount usually expressed in pounds per acre of the active material; that is, the diphenyl nitrone, to the soil. Also, where the composition consists of a water-dispersible formulation which will be diluted with water for end-use purposes, smaller amounts of inert diluent will be employed and the diluted composition, which also falls within the scope of this invention, will contain a mixture of water and the concentrated formulation.

Where the surfaces of seeds are to be treated, a liquid slurry or a powdered composition may be employed and the powdered composition used to dust at least a portion of the surfaces of the seeds will usually contain larger quantities of the phenyl nitrone compounds than where a liquid composition is used to atomize the material on the surfaces of the seeds. Compositions covering all uses will generally contain from about 0.5 to about 95 weight percent of at least one phenyl nitrone and from about 99.5 to about 0.5 weight percent of inert carrier or diluent.

In one of its embodiments, the invention provides a process which comprises contacting soil with from about 0.6 to about 100 pounds per acre broadcast of the composition of this invention. Although soils which are infested with micro-organisms which are pathogenic to cultivated plants are usually contacted with the compositions of this invention, soils which do not contain appreciable quantities of such micro-organisms may also be contacted to prevent possible future infestation of the soil by the pathogens.

The contact of the soil can be effected in a variety of ways, and the specific manner will depend upon whether the composition is in liquid form. Where the composition is in liquid form, contact can be effected with a conventional spray apparatus such as those commonly employed in the agricultural pesticide field. If the composition is a finely divided pulverulent or granular solid, contact may be effected in much the same manner used in the application of conventional fertilizers. In fact, the inert carrier itself may be a fertilizer as long as its components are inert with respect to the phenyl nitrone components of the compositions of this invention.

When the compositions of this invention are used to treat at least a portion of the seeds of cultivated plants, the contact of the seeds will depend again on whether the composition is in liquid or particulate solid form. For example, if the composition is in liquid form, the material can be sprayed on the seeds which can then be tumbled to provide an admixture of the composition with the seeds. On the other hand, if the composition is in pulverulent or particulate form, the composition can be mixed, preferably by tumbling, with the seeds to insure intimate contact of the composition particles with the seeds.

The amount of composition which may be employed to contact the soil can vary widely depending upon the amount and kinds of plant pathogens which are in the soil as well as the type of soil to be treated. Generally, the amount of composition will vary between from about 0.6 to about 100 pounds of composition broadcast per acre of soil. If less than about 0.6 pound per acre is employed, there is some danger that not all of the micro-organisms will be killed. Although more than 100 pounds may sometimes be employed, such amounts are often economically disadvantageous and there is some danger insofar as certain plants are concerned of the composition's exerting a mild phytotoxic effect on the plants.

When seeds are to be contacted, the amount of composition will vary from about 0.2 to about 4 percent based on the weight of the seeds. The amount of composition employed will depend upon the size of the seeds and therefore the surface area thereof, and higher amounts will be employed where the size of the plant seed is small and lower amounts employed where the size of the plant seed is large. If less than about 0.2 percent of the composition is employed, there is some danger that seeds will not be adequately protected against attack by plant pathogens. If more than about 4 percent of composition is employed, there is some danger insofar as certain plant species are concerned that injury to the plant may occur during the germination of the seed.

The following specific examples are intended to illustrate the invention, but not to limit the scope thereof; parts and percentages being by weight unless otherwise specified:

Example 1

Standard greenhouse soil was conventionally sterilized with methyl bromide and placed in 32 4-inch-square by 6-inch-deep disposable containers. Seven of the 32 containers were inoculated with a culture of the fungus *Pythium irregulare*. A second set of seven containers was inoculated with cultures of *Rhizoctonia solani*, a third set of seven containers was inoculated with *Sclerotium rolfsii*, and a fourth set of seven containers was inoculated with *Fusarium oxysporum*. The remaining four containers were set aside as sterile soil controls. Thereafter, three of the set of seven containers which had been inoculated with the *Pythium irregulare* fungus were treated with 100, 50, and 25 parts per million, respectively, based on the weight of the soil, of a dispersion of an alpha-(p-chlorophenyl)-N-phenyl nitrone. Three of the containers which had been inoculated with the *Pythium irregulare* fungus were treated with 100, 50 and 25 parts per million, respectively, based on the weight of the soil, with a dispersion of 1-chloro-2-nitro propane, a commercially available fungicide sold under the trademark of "Lanstan." The seventh inoculated container was set aside without treatment to serve as a control.

Three containers of the set of seven which had been inoculated with the *Rhizoctonia solani* fungus were treated with 100, 50, and 25 parts per million, respectively, based on the weight of the soil, with the alpha-(p-chlorophenyl)-N-phenyl nitrone. Three of the other containers which had been inoculated with the *Rhizoctonia solani* fungus were treated with 100, 50, and 25 parts per million, respectively, based on the weight of the soil, with the commercial product 1-chloro-2-nitro propane; and the seventh container so inoculated was set aside without further treatment to serve as a control.

Three containers of the set of seven which had been inoculated with *Sclerotium rolfsii* fungus were treated with 100, 50, and 25 parts per million, respectively, based on the weight of the soil, with the alpha-(p-chlorophenyl)-N-phenyl nitrone. Three of the other containers which had been inoculated with the *Sclerotium rolfsii* fungus were treated with 100, 50, and 25 parts per million, respectively, based on the weight of the soil, with the commercial product 1-chloro-2-nitro propane; and the seventh container so inoculated was set aside without further treatment for control purposes.

Three containers of the set of seven which had been inoculated with the *Fusarium oxysporum* fungus were treated with 100, 50, and 25 parts per million, respectively, based on the weight of the soil, with the alpha-(p-chlorophenyl)-N-phenyl nitrone. Three of the other containers which had been inoculated with the *Fusarium oxysporum* fungus were treated with 100, 50, and 25 parts per million, respectively, based on the weight of the soil, with the commercial product 1-chloro-2-nitro propane; and the seventh container so inoculated was set aside without further treatment for control purposes. The results are set forth in Table I below:

TABLE I

Response of fungi to chemicals applied as drenches. Measurement of mycelial development on the soil surface]

| Chemical treatments | Dose, p.p.m. BW/S | Mycelial growth, percent container surface covered | | | |
|---|---|---|---|---|---|
| | | Pythium irregulare | Rhizoctonia solani | Sclerotium rolfsii | Fusarium oxysporum |
| α-(p-Chlorophenyl)-N-phenyl nitrone | 100 | 30 | 10 | 40 | 10 |
| Do | 50 | 80 | 60 | 60 | 40 |
| Do | 25 | 100 | 70 | 100 | 70 |
| 1-chloro-2-nitro propane | 100 | 20 | 10 | 50 | 30 |
| Do | 50 | 30 | 30 | 100 | 100 |
| Do | 25 | 50 | 60 | 100 | 100 |
| Sterile soil | | | | | |
| Inoculated soil | | 100 | 100 | 100 | 100 |

The results show that the compound alpha-(p-chlorophenyl)-N-phenyl nitrone is more effective than the standard commercially available product against *Sclerotium rolfsii* and *Fusarium oxysporum*. The results further show that the compound is at least partially effective in controlling the *Pythium irregulare* and the *Rhizoctonia solani* organisms in soil.

In the foregoing example, the containers were inoculated by admixing 10 percent of a given culture which had been prepared and maintained by adding the organisms to a sterile soil to which had been added 20 percent by weight, based on the weight of the soil, of cornmeal. When Example 1 is repeated employing alpha-N-diphenyl nitrone and alpha-(2,4-dichlorophenyl)-N-phenyl nitrone, alpha-(p-bromophenyl)-N-phenyl nitrone, alpha-(3-hydroxyphenyl)-N-phenyl nitrone, alpha-(2-nitrophenyl)-N-phenyl nitrone, and alpha-(tolyl)-N-phenyl nitrone, similar results are obtained.

Example 2

The soil sterilization and inoculation procedures of Example 1 were repeated except that 9 instead of 32 containers were filled with sterile greenhouse soil and inoculated with a culture of the organism *Pythium irregulare*. Just prior to this inoculation 10 English pea seeds were planted in each container. Thereafter, four of the nine containers were treated with 100, 50, 25, and 12.5 parts per million, respectively, based on the weight of the soil, of alpha-(p-chlorophenyl)-N-phenyl nitrone. Also, four of the containers were treated with 100, 50, 25, and 12.5 parts per million, respectively, based on the weight of the soil, with 1-chloro-2-nitro propane, the commercial standard. One container containing sterile soil was also planted with English pea seeds as was an untreated inoculated container. The results are given in Table II below.

TABLE II

[Response of a soil fungus to chemicals applied as soil drenches and the influence of these treatments on plant stands. Greenhouse]

| Chemical treatments | Dose, p.p.m. by weight of soil | Plant stand, percent of sterile soil check, *Pythium irregulare*, English peas |
|---|---|---|
| α-(p-Chlorophenyl)-N-phenyl nitrone | 100 | 95 |
| Do | 50 | 90 |
| Do | 25 | 74 |
| Do | 12.5 | 53 |
| 1-chloro-2-nitro propane | 100 | 1 53 |
| Do | 50 | 100 |
| Do | 25 | 95 |
| Do | 12.5 | 74 |
| Sterile soil | | 95 |
| Inoculated soil | | 0 |

1 Phytotoxicity.

The results show that none of the seeds planted in the untreated inoculated soil produced plants, but that the sterile soil produced 95 percent of plants from the seeds. The alpha - (p - chlorophenyl) - N - phenyl nitrone was equal to the sterile soil control at 100 parts per million and the commercial product was phytotoxic at this level. In the containers dosed at 50, 25, and 12.5 parts per million, in each instance the alpha - (p - chlorophenyl)- N-phenyl nitrone and the commercial product were substantially the same.

Example 3

The procedure of Examples 1 and 2 were repeated except that seven containers which had been planted with beets were inoculated with a culture of *Rhizoctonia solani*. A second set of seven containers in which cucumber seeds had been planted was inoculated with a culture of *Sclerotium rolfsii* and a third set of seven containers in which tomato seeds had been planted was inoculated with *Fusarium oxysporum*.

Three of the containers in which beets had been planted were treated with 100, 50, and 25 parts per million, respectively, of alipha - (p - chlorophenyl) - N - phenyl nitrone. A second set of three containers in which beets had been planted were treated with 100, 50, and 25 parts per million, respectively, of the commercial standard 1-chloro-2-nitro propane. A second set of three containers in which beets had been planted were treated with 100, 50, and 25 parts per million, respectively, of the commerical standard 1-chloro-2-nitro propane.

A set of three of the containers in which cucumber seeds had been planted and which had been inoculated with *Sclerotium rolfsii* was treated with 100, 50, and 25 parts per million, respectively, with the alpha-(p-chlorophenyl) - N - phenyl nitrone. Another set of three containers which had been inoculated with *Sclerotium rolfsii* and in which cucumber seeds had been planted was treated with 100, 50, and 25 parts per million, respectively, of the commercial standard 1-chloro-2-nitro propane.

A set of three containers in which tomato seeds had been planted and which had been inoculated with *Fusarium oxysporum* was treated with 100, 50, and 25 parts per million, respectively, of alpha - (p - chlorophenyl) - N-phenyl nitrone. Another set of three containers which had been inoculated with *Fusarium oxysporum* and which contained tomato seeds was treated with 100, 50 and 25 parts per million, respectively, of the commercial standard 1-chloro-2-nitro propane. Control containers; that is, containers containing sterile soil and inoculated soil were maintained in each instance.

The results are shown in Table III and indicate that the alpha - (p - chlorophenyl) - N - phenyl nitrone was more effective against the fungus *Fusarium oxysporum* when tomatoes are grown, and the commercial standard was relatively ineffective in preventing attack on tomatoes by *Fusarium oxysporum*. In the case of the cucumber and beet plants, the nitrone exhibited substantially the same results.

TABLE III

[Response of soil fungi to chemicals applied as soil drenches and the influence of these treatments on plant stands. Greenhouse]

| Chemical Treatment | Dose, p.p.m. BW/S | Plant Stand, Percent of Sterile Soil Check | | |
|---|---|---|---|---|
| | | Rhizoctonia Solani Beets | Sclerotium rolfsii Cucumbers | Susarium oxysporum, Tomatoes |
| α-(p-Chlorophenyl)-N-phenyl nitrone | 100 | 1 47 | 18 | 88 |
| Do | 50 | 80 | 18 | 100 |
| Do | 25 | 67 | 18 | 100 |
| 1-chloro-2-nitro propane | 100 | 1 13 | 18 | 1 24 |
| Do | 50 | 100 | 18 | 71 |
| Do | 25 | 67 | 0 | 47 |
| Sterile soil | | 75 | 85 | 85 |
| Inoculated soil | | 10 | 5 | 40 |

1 Phytotoxicity.

Example 4

The sterilization and inoculation procedures described in Example 1 were repeated except that seven containers were inoculated with cultures of *Rhizoctonia solani*. Just prior to inoculation, beet seeds which were to be planted were contacted with a formulation containing a mixture of 50 percent alpha - (p - chlorophenyl) - N - phenyl nitrone and 50 percent attapulgus clay. The treatment levels of the beet seeds were 4, 2, and 1 ounce of formulation per bushel of seeds, respectively.

Another portion of seeds was treated with the same concentrations of a formulation consisting of a mixture of 50 percent N-trichloromethyl thio - 4 - cyclohexene, 1,2-dicarboximide, a commercial fungicide sold under the trade name of "Captan." The results are set forth in the table below, and show that the compound alpha-(p-chlorophenyl) - N - phenyl nitrone has substantially the same effectiveness at the two higher levels as the standard product. At the lower levels, the test product was slightly more effective than the standard product.

TABLE IV

Response of a soil fungus to chemicals applied as seed treatments and the influence of these applications on plant stands. Greenhouse]

| Chemical treatments | Dose, oz./bu., 50% formulation | Plant stand, percent of sterile soil check, *Rhizoctonia solani*, beets |
|---|---|---|
| α-(p-Chlorophenyl)-N-phenyl nitrone | 4 | 88 |
| Do | 2 | 88 |
| Do | 1 | 70 |
| N-trichloromethyl thio-4-cyclohexene-1,2-dicarboximide | 4 | 88 |
| Do | 2 | 94 |
| Do | 1 | 59 |
| Sterile soil | | 85 |
| Inoculated soil | | 20 |

In the foregoing examples, the following additional compounds have been evaluated, and substantially the same results were obtained as those specifically set forth in the examples:

alpha-(p-hydroxyphenyl)-N-phenyl nitrone
alpha-(p-methoxyphenyl)-N-phenyl nitrone
alpha-(p-ethoxyphenyl)-N-phenyl nitrone
alpha-(p-n-propoxyphenyl)-N-phenyl nitrone
alpha-(p-nitrophenyl)-N-phenyl nitrone
alpha-(2,4-dinitrophenyl)-N-phenyl nitrone
alpha-(p-ethylphenyl)-N-phenyl nitrone

What is claimed is:

1. A method of protecting plants from fungi which comprises contacting the soil in which said plants grow with about 0.6–100 pounds per acre of an alpha-phenyl-N-nitrone of the formula:

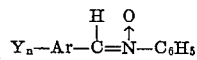

wherein Y is a substituent selected from the group consisting of chloro, bromo, fluoro, hydroxyl, $C_{1-4}$ alkyl, $C_{1-4}$ alkoxy and nitro; Ar is phenyl; and $n=0-5$.

2. The method of claim 1 wherein said nitrone is alpha-(para-chlorophenyl) N-phenyl nitrone.

3. The method of claim 1 wherein said nitrone is compounded with a non-ionic surfactant, an anionic surfactant or mixtures thereof.

4. A method of protecting plants from soil fungi which comprises coating the plant seed prior to the planting thereof, with about 0.2–4 percent by weight of a nitrone of claim 1.

References Cited

J. Org. Chem., 35 (3), pp. 845–9 (March 1970).
Tetrahedron 24, pp. 5193–5203 (1968).

ALBERT T. MEYERS, Primary Examiner
L. SCHENKMAN, Assistant Examiner